United States Patent
Qiu et al.

(10) Patent No.: US 11,996,767 B1
(45) Date of Patent: May 28, 2024

(54) ADAPTIVE TIMING FOR HIGH FREQUENCY INVERTERS

(71) Applicant: Apple Inc., Cupertino, CA (US)

(72) Inventors: Weihong Qiu, San Ramon, CA (US); Jun Liu, Pleasanton, CA (US); Jizhen Fu, San Jose, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 17/816,074

(22) Filed: Jul. 29, 2022

Related U.S. Application Data

(60) Provisional application No. 63/366,097, filed on Jun. 9, 2022.

(51) Int. Cl.
| | |
|---|---|
| *H02M 1/08* | (2006.01) |
| *H02J 50/10* | (2016.01) |
| *H02M 1/38* | (2007.01) |
| *H02M 7/5387* | (2007.01) |
| *H02M 7/5395* | (2006.01) |

(52) U.S. Cl.
CPC .............. *H02M 1/385* (2021.05); *H02J 50/10* (2016.02); *H02M 1/083* (2013.01); *H02M 7/53871* (2013.01); *H02M 7/5395* (2013.01)

(58) Field of Classification Search
CPC ........ H02J 50/10; H02M 1/083; H02M 1/385; H02M 7/53871; H02M 7/53873; H02M 7/5395; H02P 27/08; H02P 27/085; H02P 29/024
See application file for complete search history.

(56) References Cited

U.S. PATENT DOCUMENTS

| | | | |
|---|---|---|---|
| 10,547,236 B1* | 1/2020 | Ramamoorthy .. | H02M 7/53871 |
| 2005/0025231 A1* | 2/2005 | Mitsuki ............... | H02M 7/5395 |
| | | | 375/238 |
| 2012/0105039 A1* | 5/2012 | Brown ................... | H02M 1/38 |
| | | | 323/283 |
| 2015/0061639 A1* | 3/2015 | Webster ................ | G01R 23/00 |
| | | | 324/76.39 |
| 2017/0187284 A1* | 6/2017 | Vaidya .................... | H02M 1/38 |
| 2018/0287544 A1* | 10/2018 | Kato .................... | H02P 27/085 |
| 2019/0157970 A1* | 5/2019 | Lee ....................... | H03K 17/166 |
| 2021/0104971 A1* | 4/2021 | Secrest ............... | H02M 7/5395 |
| 2021/0143731 A1* | 5/2021 | Ji ........................... | H02M 1/38 |
| 2023/0091718 A1* | 3/2023 | Liu ................... | H02M 3/33573 |
| | | | 320/108 |

* cited by examiner

*Primary Examiner* — Levi Gannon
(74) *Attorney, Agent, or Firm* — FLETCHER YODER PC

(57) ABSTRACT

A method of adaptively controlling dead time between turn off of a first switching device of an inverter and turn on of a second switching device of the inverter that is a counterpart of the first switching device can include: monitoring a plurality of switching events of at least one of the first and second switching devices, storing for each monitored switching event an indication whether a dead time associated therewith permitted optimal switching, and adaptively controlling the dead time responsive to the stored indications. Monitoring a plurality of switching events of at least one of the first and second switching devices can further include sampling an output voltage of the inverter and comparing the sampled output voltage to one of a high reference voltage corresponding to a high inverter rail voltage and a low reference voltage corresponding to a low inverter rail voltage.

22 Claims, 6 Drawing Sheets

ADAPTIVE TIMING FOR HIGH FREQUENCY INVERTERS

CROSS-REFERENCE TO RELATED APPLICATIONS

This application claims priority to U.S. Provisional Application No. 63/366,097, filed Jun. 9, 2022, entitled "ADAPTIVE TIMING FOR HIGH FREQUENCY INVERTERS," the disclosure of which is incorporated by reference in its entirety.

BACKGROUND

Wireless power transfer ("WPT"), such as inductive power transfer ("IPT"), may be used to provide power for charging various battery-powered electronic devices. One application in which WPT has seen increases in use is the consumer electronics space around devices such as mobile phones (i.e., smart phones) and their accessories (e.g., wireless earphones, smart watches, etc.) as well as tablets and other types of portable computers and their accessories (e.g., styluses, etc.).

SUMMARY

A method of adaptively controlling dead time between turn off of a first switching device of an inverter and turn on of a second switching device of the inverter that is a counterpart of the first switching device can include: monitoring a plurality of switching events of at least one of the first and second switching devices, storing for each monitored switching event an indication whether a dead time associated therewith permitted optimal switching, and adaptively controlling the dead time responsive to the stored indications. Monitoring a plurality of switching events of at least one of the first and second switching devices can further include sampling an output voltage of the inverter and comparing the sampled output voltage to one of a high reference voltage corresponding to a high inverter rail voltage and a low reference voltage corresponding to a low inverter rail voltage. Comparing the sampled output voltage to a high reference voltage corresponding to a high inverter rail voltage can determine whether a corresponding switching event of a high side switch was an optimal switching event corresponding to zero voltage switching without excessive body diode conduction time. Comparing the sampled output voltage to a low reference voltage corresponding to a low inverter rail voltage can determine whether a corresponding switching event of a low side switch was an optimal switching event corresponding to zero voltage switching without excessive body diode conduction time. The high reference voltage can be 0.95 times the high inverter rail voltage, and the low reference voltage can be 0.05 times the high inverter rail voltage.

Adaptively controlling the dead time responsive to the stored indications can further include decreasing the dead time responsive to one or more indications that the dead time is too long and/or increasing the dead time responsive to one or more indications that the dead time is too short. One or more indications that the dead time is too long can be a majority of the stored indications, a supermajority of the stored indications, or a selected number of sequential indications that the dead time is too long. One or more indications that the dead time is too short can be a majority of the stored indications, a supermajority of the stored indications, or a selected number of sequential indications that the dead time is too short.

An inverter can include a first switching device; a second switching device that is a counterpart of and is switched complementarily to the first switching device; and control circuitry that monitors a plurality of switching events of at least one of the first and second switching devices, stores an indication whether a dead time associated with the monitored plurality of switching events permitted optimal switching for each monitored switching event, and adaptively controls a dead time between turn off of the first switching device and turn on of the second switching device responsive to the stored indications. The control circuitry that monitors a plurality of switching events of at least one of the first and second switching devices can include a sample and hold circuit that samples an output voltage of the inverter and a comparator that compares the sampled output voltage to one of a high reference voltage corresponding to a high inverter rail voltage and a low reference voltage corresponding to a low inverter rail voltage. The control circuitry can adaptively control the dead time responsive to the stored indications by decreasing the dead time responsive to one or more indications that the dead time is too long and/or increasing the dead time responsive to one or more indications that the dead time is too short. One or more indications that the dead time is too long can be a majority of the stored indications, a supermajority of the stored indications, or a selected number of sequential indications that the dead time is too long. One or more indications that the dead time is too short can be a majority of the stored indications, a supermajority of the stored indications, or a selected number of sequential indications that the dead time is too short.

A wireless power transmitter can include an inverter that receives a DC input voltage and generates an AC output voltage; a wireless power transmitter coil that receives the AC output voltage and magnetically couples to a wireless power receiving coil of a wireless power receiver to facilitate wireless power transfer; and inverter controller circuitry that monitors a plurality of switching events of at least one of first and second complementary switching devices of the inverter, stores an indication whether a dead time associated with the monitored plurality of switching events permitted optimal switching for each monitored switching event, and adaptively controls a dead time between turn off of the first switching device and turn on of the second switching device responsive to the stored indications. The inverter controller circuitry that monitors a plurality of switching events of at least one of the first and second switching devices can include a sample and hold circuit that samples an output voltage of the inverter and a comparator that compares the sampled output voltage to one of a high reference voltage corresponding to a high inverter rail voltage and a low reference voltage corresponding to a low inverter rail voltage. The control circuitry can adaptively control the dead time responsive to the stored indications by decreasing the dead time responsive to one or more indications that the dead time is too long and/or increasing the dead time responsive to one or more indications that the dead time is too short. One or more indications that the dead time is too long can be a majority of the stored indications, a supermajority of the stored indications, or a selected number of sequential indications that the dead time is too long. One or more indications that the dead time is too short can be a majority of the stored indications, a supermajority of the stored indications, or a selected number of sequential indications that the dead time is too short.

DETAILED DESCRIPTION

Figure 1:
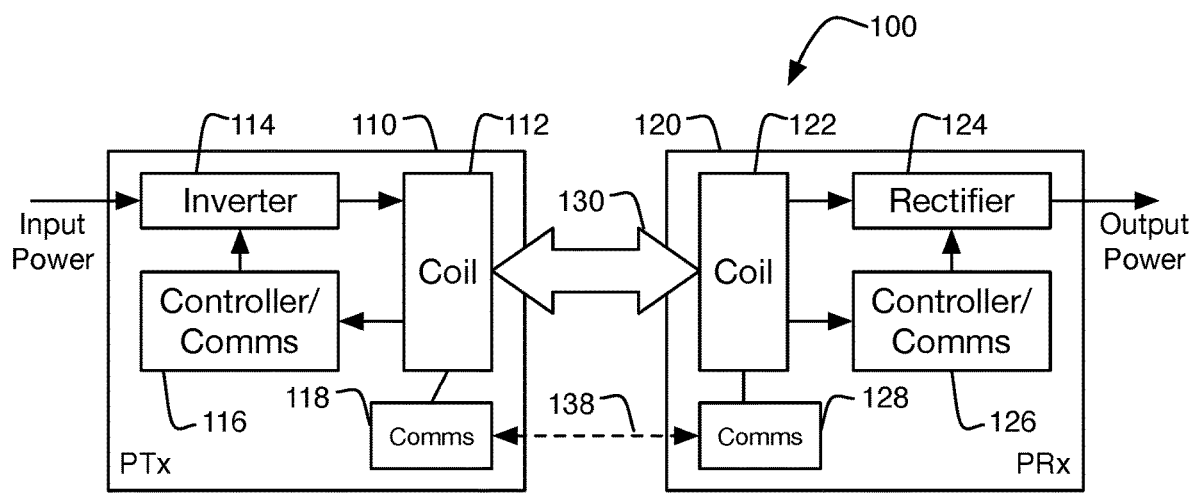
FIG. 1 illustrates a block diagram of a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number provided in a drawing refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications using capacitive-modulation-based or load-modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate provide a given output voltage depending on the particular application. In some embodiments, the controller/communications module may be configured to send information to the PTx device to effectively control the power delivered to the receiver. This information may be received sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information to from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a communications ("comms") module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Figure 2:
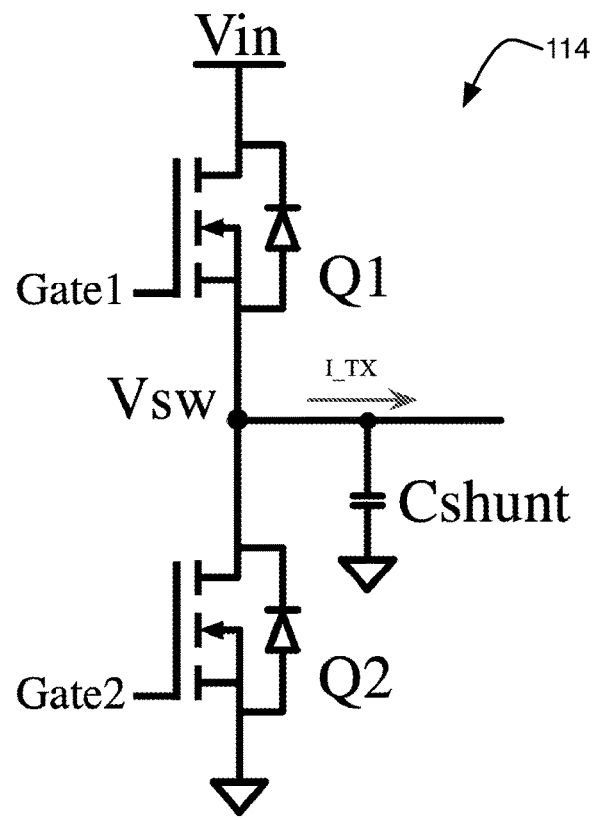
FIG. 2 illustrates a simplified schematic of an inverter, which could be used in a wireless power transfer system.

FIG. 2 illustrates a schematic diagram of an inverter 114, as may be used in a wireless power transmitter (PTx) of a wireless power transfer system. The illustrated inverter is a half bridge inverter, so named because the switching devices Q1 and Q2 form a half bridge that selectively couples input DC voltage Vin or ground to the switching node Vsw, thus generating an alternating voltage at this terminal. Switches Q1 and Q2 are illustrated as n-channel MOSFETs, although other suitable switching devices, including but not limited to p-channel MOSFETs could also be used. Switches Q1 and Q2 may be driven substantially complementarily, so that when Q1 is turned on (via a drive signal applied to Gate1), Q2 is turned off (via a drive signal applied to Gate2), and vice versa. The drive of switches Q1 and Q2 is "substantially" complementarily, as a short dead time may be provided at each switching transition to ensure that the switch being turned off before the counterpart switch is turned on. This can prevent short circuiting the input voltage. Additionally, controlling the timing of the switching transitions (e.g., switching frequency, duty cycle, etc.) can be used to control the output voltage (and thus the power delivered) by the inverter.

As a result of the above-described operation, the alternating voltage appearing at Vsw (i.e., the inverter output voltage) is effectively a square wave alternating between 0V (ground) and Vin according to the switching frequency and or duty cycle of switches Q1 and Q2. The voltage is "effectively" a square wave because the capacitance at the inverter switching node Vsw (illustrated by capacitor Cshunt) can cause the voltage to have a slight ramp up/ramp down time at the switching transitions, as discussed in greater detail below with respect to FIGS. 3A-3B. In any case, controller/comms circuitry 116 discussed above can include circuitry for generating the gate drive signals Gate1 and Gate2 that produce the operation described above. Additionally, inverter topologies other than a half bridge could be used, such as a full bridge inverter, etc.

Figure 3A:
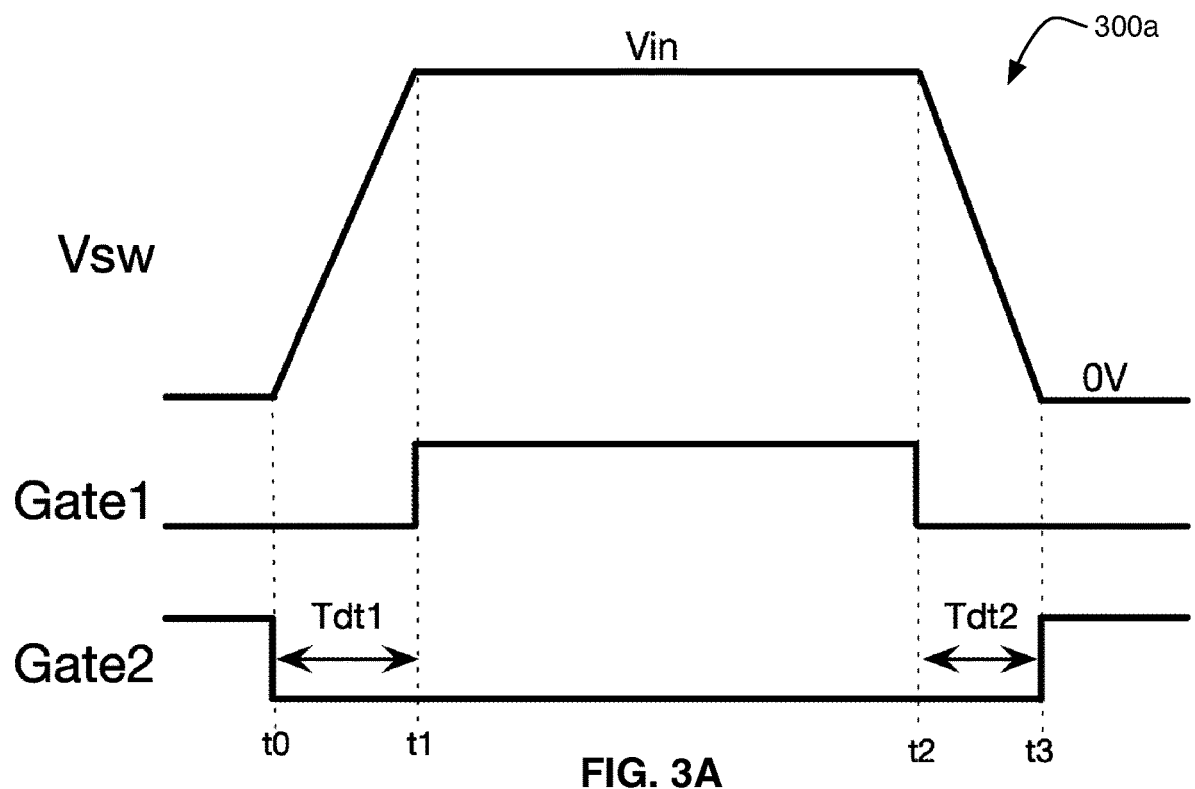
FIG. 3A illustrates various waveforms associated with switch timing of an inverter having optimal dead time between switching events.

FIG. 3A illustrates a plot 300a of waveforms associated with an inverter, such as the half bridge inverter 114 illustrated in FIG. 2 featuring "optimal" dead times at the switching transitions. Plot 300a includes Vsw—the "output" of the inverter (i.e., the voltage appearing at terminal Vsw), Gate1, which is the gate drive signal for upper switch Q1, and Gate2, which is the gate drive signal for lower switch Q2. FIG. 3A illustrates the switching transitions associated with a single switching cycle. Thus, beginning just before time t0, Gate1 is low, meaning switch Q1 is turned off, and Gate2 is high, meaning switch Q2 is turned on. As a result, the node Vsw is coupled to ground, and the output voltage is 0V. At time t0, Gate2 transitions low, turning off lower switch Q2 and initiating a first dead time Tdt1 during which both switches are turned off. During this interval, the output voltage Vsw climbs to a value Vin at time t1. This indicates the end of the dead time, when Gate1 transitions high, turning on upper switch Q1. At time t2 (determined by the inverter controller) Gate1 transitions low again, turning off upper switch Q1. This commences second dead time Tdt2. During this interval output voltage Vsw decreases to 0V at time t3, marking the end of the dead time Tdt2, and the point at which Gate2 transitions high, turning on switch Q2. At each turn on switching transition, the voltage across the switch turning on is the same before and after the switching event, which can be described as "zero-voltage switching (ZVS)."

Figure 3B:
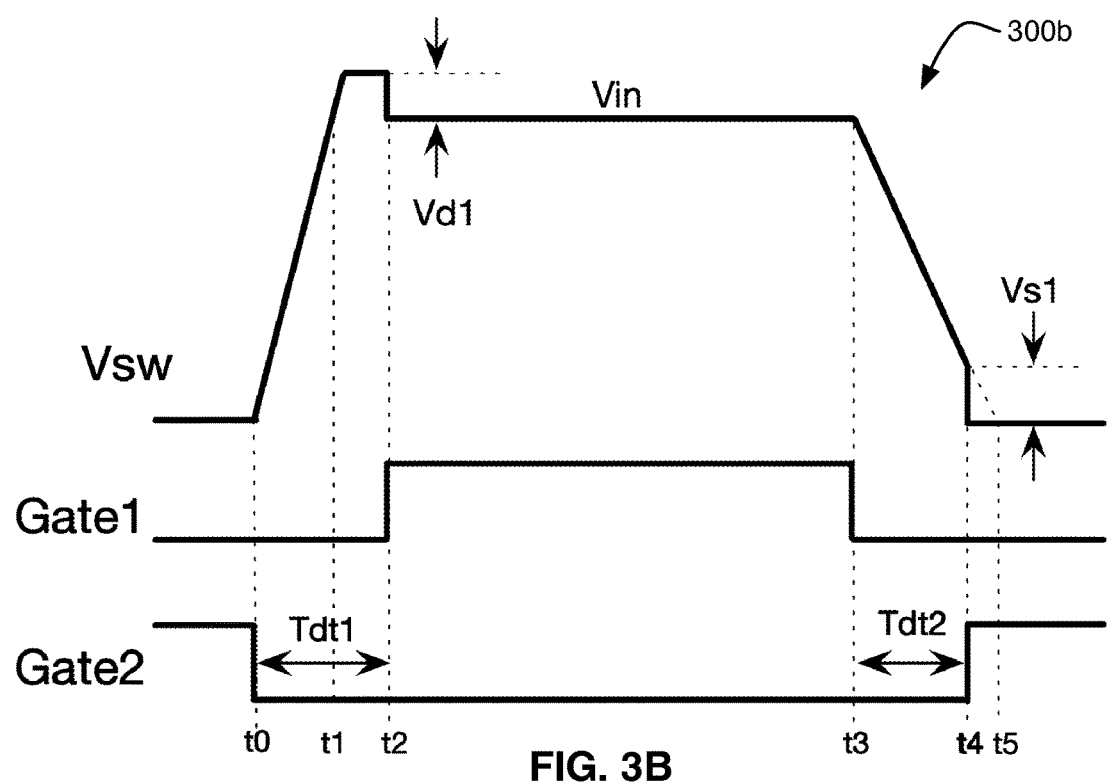
FIG. 3B illustrates various waveforms associated with switch timing of an inverter having sub-optimal dead time between switching events.

FIG. 3B illustrates a plot 300b of waveforms associated with an inverter, such as the half bridge inverter 114 illustrated in FIG. 2 featuring sub-optimal dead times at the switching transitions. These transitions are sub-optimal in that they are either too long, meaning that the switch turning on turns on too late, or too short, meaning that the switch turning on turns on too early. As a result, the turn on transitions are not optimal switching events. Conversely, an optimal switching event would be one in which the switch turned on neither too early (thus allowing zero voltage switching) nor too late (thus preventing excessively long body diode conduction). Plot 300b includes Vsw—the "output" of the inverter (i.e., the voltage appearing at terminal Vsw), Gate1, which is the gate drive signal for upper switch Q1, and Gate2, which is the gate drive signal for lower switch Q2.

FIG. 3B illustrates the switching transitions associated with a single switching cycle. Thus, beginning just before time t0, Gate1 is low, meaning switch Q1 is turned off, and Gate2 is high, meaning switch Q2 is turned on. As a result, the node Vsw is coupled to ground, and the output voltage is 0V. At time t0, Gate2 transitions low, turning off lower switch Q2 and initiating a first dead time Tdt1 during which both switches are turned off. During this interval, the output voltage Vsw climbs to a value Vin at time t1. However, Gate1 does not transition high at this point, meaning that dead time Tdt1 extends until time t2, at which point Gate1 transitions high turning on upper switch Q1. As a result, the output voltage overshoots Vin by an amount Vd1, dropping down to Vin at the switching transition. This results in unnecessarily extended conduction time of the intrinsic body diode of switch Q1, which leads to unnecessarily increased conduction losses that can adversely affect the efficiency of the inverter (and an associated wireless power transfer system). Alternatively, had Gate1 transitioned high somewhat earlier, the switching transition would have occurred prior to Vsw climbing to Vin, resulting in a non-zero voltage switching transition and resulting in increased switching losses. At time t3, (as determined by control/comms circuitry 116 for suitable output regulation) Gate1 transitions low, turning off upper switch Q1 and commencing dead time Tdt2. During this interval output voltage Vsw decreases toward reaching 0V at time t5; however, Gate2 transitions high at time t4 (prior to t5) marking the end of the dead time Tdt2. Because output voltage Vsw has not reached 0 at this point (instead being at a value Vs1), lower switch Q2 also undergoes a non-ZVS transition and experiences switching losses that can adversely affect the efficiency of the inverter (and an associated wireless power transfer system). Alternatively, had Gate2 transitioned high somewhat later, the switching transition would have occurred substantially after occurred after Vsw reached 0, resulting in unnecessarily extended conduction time of the intrinsic body diode of switch Q2, leading to increased conduction losses.

Figure 4:
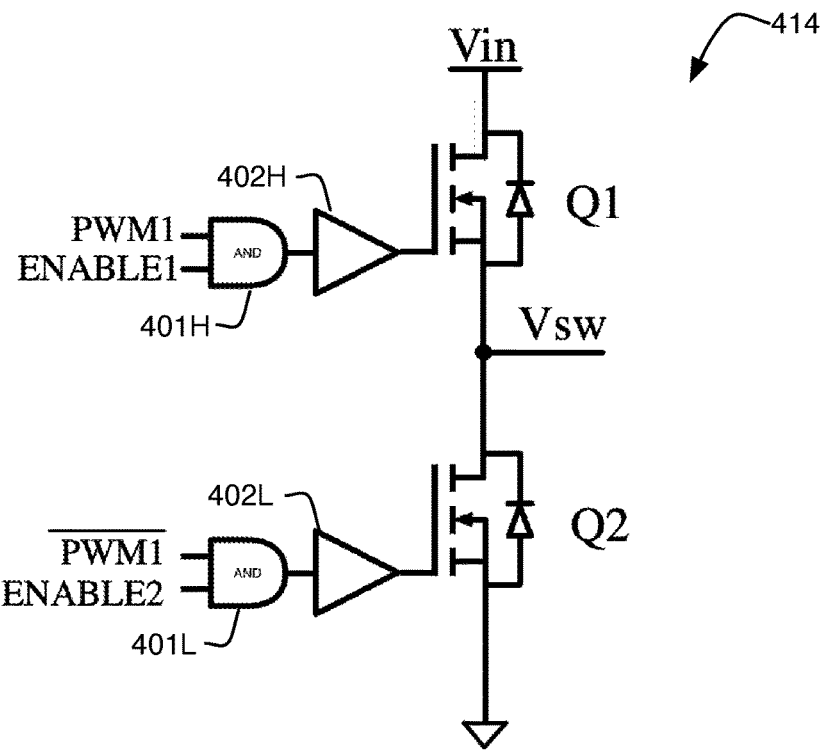
FIG. 4 illustrates a simplified schematic of an inverter, which could be used in a wireless power transfer system.

In some applications, it may be desirable to provide for relatively high frequency operation of inverter 114. In this context, "high frequency" can mean operation at frequencies of 1 MHz or higher, for example 6-7 MHz, and specifically 6.78 MHz. However, other frequencies could also be used. As the inverter switching frequency increases, dead time control to achieve optimal switching (ZVS without unnecessarily extended body diode conduction) can become more difficult because of the short time periods and fast response times, and switching losses can become magnified. Thus, it may be desirable to provide for enhanced control logic and/or circuitry that ensures optimal switching dead times. FIG. 4 illustrates an exemplary inverter 414 that is modified to adapt to such high frequency operation. In inverter 414, upper/lower switches Q1/Q2 include modified gate drive signal circuitry. More specifically, the gate drive trains include AND gates (401H/401L) that receive the PWM signals (PWM1 and inverted PWM1) generated as described above. These and gates also receive ENABLE1 and ENABLE2 signals that must be high together with the respective PWM signals for gate drivers 402H/402L to be triggered to turn on the respective switches. These ENABLE signals can be produced by the control circuitry by adjusting the timing of these ENABLE signals by increasing or decreasing the dead time responsive to whether some number of preceding switching events were appropriate transitions or not, as described in greater detail below.

Figure 5:
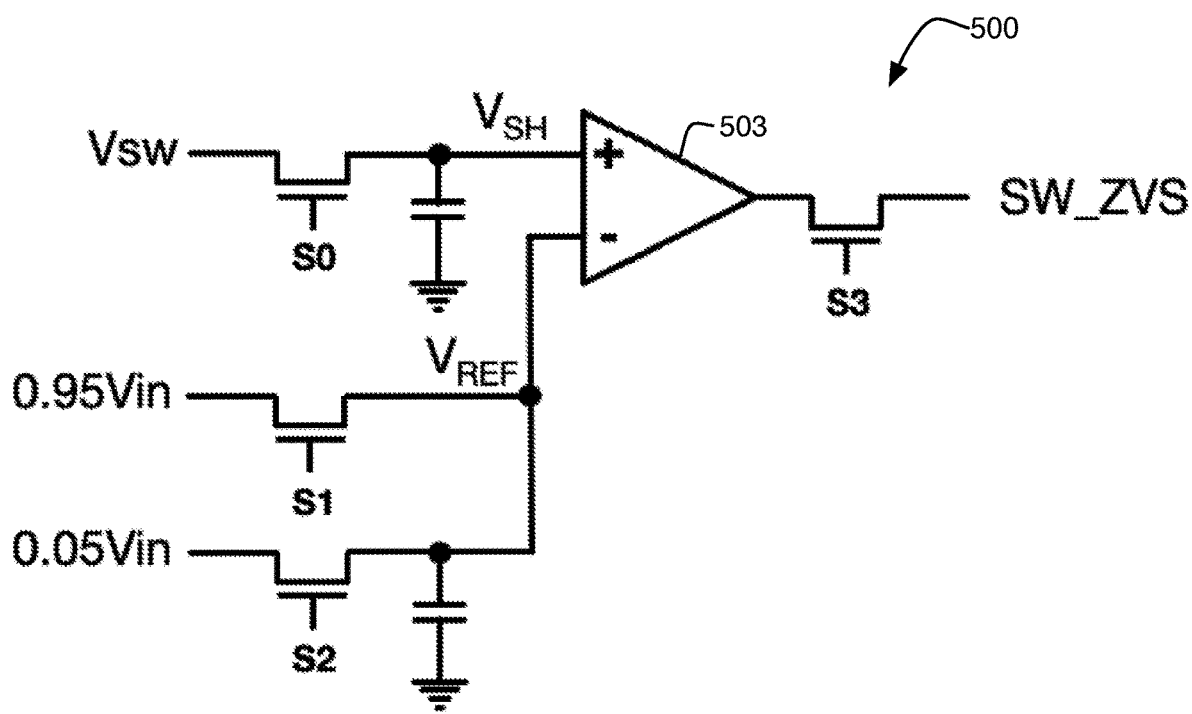
FIG. 5 illustrates a sample and hold circuit for optimizing dead time in an inverter.

At root, part of the problem with operating at increasingly high frequencies is that the comparators (or equivalent circuitry) that monitor the output voltage Vsw to determine whether it has reached a "target" value that will allow zero-voltage switching have speed limits. In other words, the comparators only operate so fast. While it is possible to use ever faster comparator circuitry, this can introduce undesired costs, etc. An alternative approach is illustrated in FIG. 5, which includes a sample and hold comparator circuit 500. In sample and hold comparator circuit 500, comparator 503 can be a more "standard" comparator, i.e., not necessarily a high-speed comparator.

One input (in this case the non-inverting input) of the comparator can be coupled to the inverter output voltage Vsw via a sample and hold circuit made up of switch S0 and a capacitor. Switch S0 may be triggered as described below to sample the inverter output voltage Vsw, such samples being denoted Vsh. The other input of comparator 503 (in this case the inverting input) may be selectively coupled by controlled operation of switch S1 and S2 to reference voltages that correspond to the input rail voltage Vin and ground. Switches S1 and S2 may be operated as described below to compare a sampled output voltage sample Vsh to one or the two reference voltages. In the illustrated example, the "high" reference voltage is equal to 0.95 Vin, although other substantial fractions of Vin could be used as appropriate for a given application. This comparison can be used to detect excessive body diode conduction time. Similarly, in the illustrated example, the "low" reference voltage is equal to 0.05 Vin, although other substantially zero voltages (i.e., voltages corresponding to the ground voltage coupled to the half bridge) could be used as appropriate for a given application. This comparison can be used to detect a non-ZVS switching event. Switches S1/S2 together with the capacitor form what is effectively a sample and hold circuit that stores reference voltage samples (Vref) for comparison with the output voltage samples Vsh.

The output of comparator 503 can be coupled via switch S3 to the remainder of the control circuitry. Switch S3 may be operated as described below to deliver a signal SW_ZVS indicating whether an immediately preceding switching transition was a zero-voltage switching (ZVS) event and/or did not result in an unnecessarily long period of body diode conduction. In the illustrated example circuit, for the high side switch, a voltage sample Vsh greater than 0.95 Vin will result in a positive comparator output signal SW_ZVS, thus indicating an overshoot corresponding to a too short dead time and unnecessarily long body diode conduction. Conversely, a voltage sample Vsh less than 0.95 Vin will result in a comparator output signal SW_ZVS of zero, thus indicating no overshoot and a dead time that is not too short, without unnecessarily long body diode conduction. For the low side switch, a voltage sample Vsh greater than 0.05 Vin will result in a positive comparator output signal SW_ZVS, thus indicating a too early transition and too short dead time, and thus non-ZVS switching. Conversely, a voltage sample Vsh less than 0.05 Vin will result in a comparator output signal SW_ZVS of zero, thus indicating an appropriate transition and a dead time that is not too short, achieving ZVS switching. In any of the foregoing cases, a sequence or series of comparator output values may be stored or by the inverter controller, so that multiple preceding switching events may be evaluated to determine whether the dead time should be adjusted.

The above-described implementation is exemplary only, and any suitable circuitry or technique may be used to determine whether a dead time is too long (or too short) to allow for zero-voltage switching. To that end, comparator 503 need not be a discrete component, or even an analog compactor, but could be any combination of analog, digital, and or programmable circuitry that provides an indication that the dead time was too long or too short. Likewise, a high output or a low output could be used to indicate the respective conditions (dead time too short, dead time too long, dead time neither too short nor too long, etc.) Additionally, the single comparison circuit could be split up into multiple circuits for high side/low side comparisons, etc.

Figure 6:
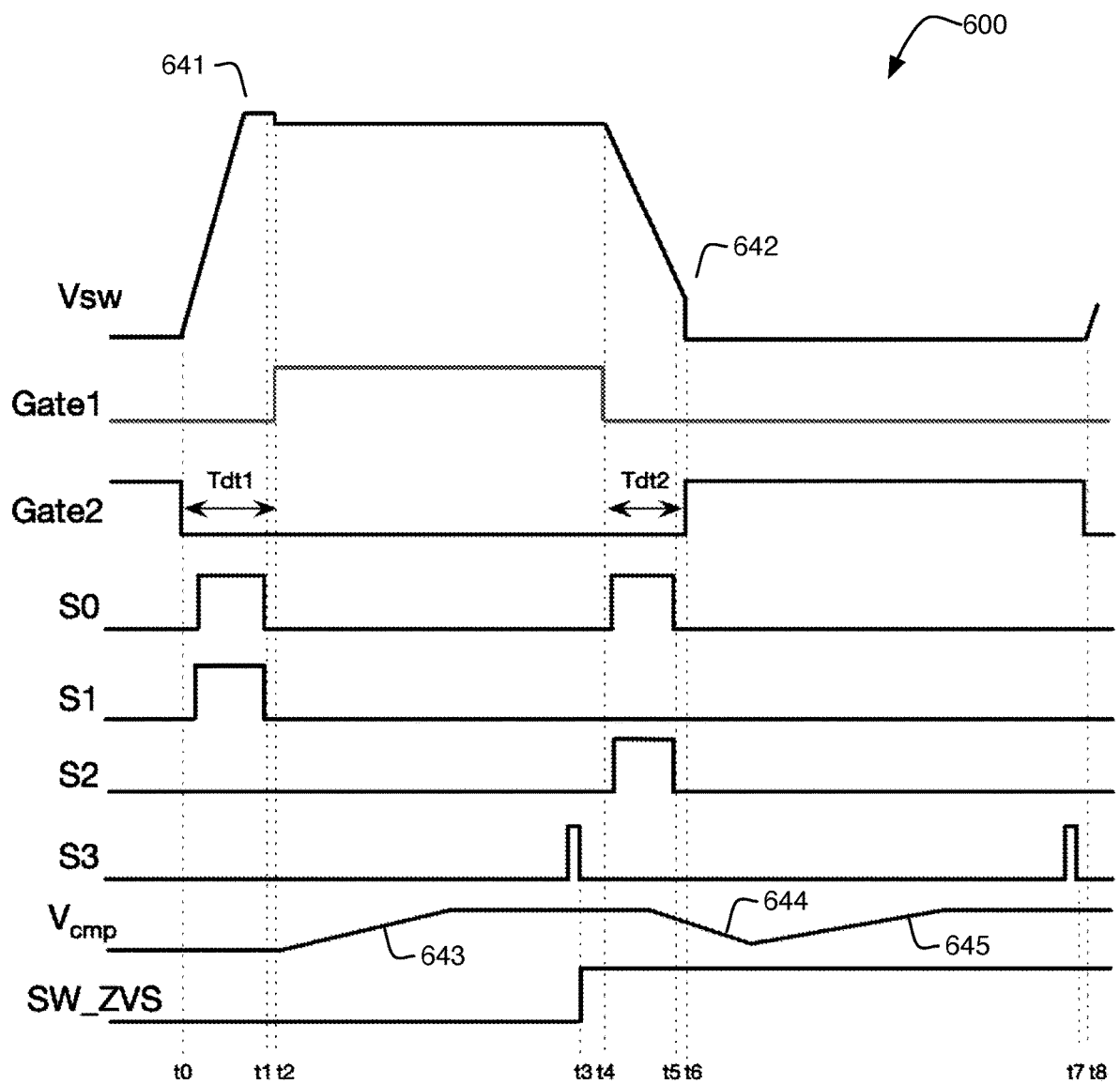
FIG. 6 illustrates various waveforms associated with switch dead time optimization for an inverter.

FIG. 6 illustrates waveform plot 600 illustrating various waveforms associated with the above-described circuitry. FIG. 6 includes output voltage (Vsw) and gate drive (Gate1/Gate2) signals as described above with respect to FIGS. 3A and 3B. FIG. 6 also depicts switching of sample and hold circuit switches S0-S3 as depicted in FIG. 5. Finally, FIG. 6 also depicts Vcmp, corresponding to the output of comparator 503, and the SW_ZVS signal that is the sampled comparator output.

Beginning just before time t0, Gate2 is high, corresponding to lower switch Q2 being turned on. Gate1 is low, corresponding to upper switch Q1 being turned off. Output voltage Vsw is zero (because Q2 is turned on, coupling the Vsw terminal to ground). As described above, at time t0 Gate2 transitions low, turning off lower switch Q2 and commencing dead time Tdt1. At some time shortly thereafter (but before t1), switch Sd0 may be turned on, allowing the sample and hold circuit coupled to the non-inverting input of comparator 503 to begin sampling output voltage Vsw. Likewise, switch S1 can be turned on, allowing the sample and hold circuit coupled to the inverting input of comparator 503 to begin sampling the "high" reference voltage corresponding to the DC rail voltage Vin. Switches S0 and S1 may be turned off at time t1, just prior to Gate1 transitioning high, turning on high upper switch Q1. This "locks in" the sample value Vsh corresponding to the value of Vsw just prior to the switching transition.

Following time t2, Gate1 is high, meaning that upper switch Q1 is turned on, and voltage Vsw is at the high voltage Vin corresponding to the inverter's upper rail voltage. During this interval, comparator 503 (which may be a relatively slow comparator) can perform a comparison of the sample Vsh corresponding to the inverter output voltage Vsw just prior to upper switch Q1 turning on. Because comparator 503 may be relatively slow, the comparator output voltage Vcmp may take a relatively long time to transition, as illustrated by slope 643. If there is an overshoot 641, indicating that dead time Tdt1 is too long, then the comparator output (Vcmp) will be high (as will be a corresponding sample SW_ZVS of the comparator output, taken as described below). Otherwise, if there is no overshoot, then dead time Tdt1 is not too long, and the comparator output (Vcmp) will be zero (as will be a corresponding sample SW_ZXVS of the comparator output, taken as described below).

Sampling the comparator output can be controlled by switch S3, which may be strobed at time t3, which is prior to time t4 at which upper switch Q1 is turned off by the transition of Gate1 to a low state (beginning dead time Tdt2). As a result of the strobing of switch S3, comparator output signal Vcmp can be sampled, appearing as signal SW_ZVS. Thus, at time t3, signal SW_ZVS transitions high. This high value can be stored to allow for comparison of a sequence of switching events as described in greater detail below.

As noted above, at time t4, Gate1 can transition low, turning off upper switch Q1 and beginning dead time Tdt2. After time t4, switches S0 and S2 can be turned on, allowing the sample and hold circuit coupled to the non-inverting input of comparator 503 to sample the inverter output voltage Vsw and the sample and hold circuit coupled to the inverting input of comparator 503 to sample the low reference voltage. Switches S0 and S2 can be turned off at time t5, prior to time t6 at which Gate2 transitions high, turning on low switch Q2. This "locks in" the sample value Vsh corresponding to the value of Vsw just prior to the switching transition.

Following time t6, Gate2 is high, meaning that lower switch Q2 is turned on, and voltage Vsw is at the low voltage (ground) corresponding to the inverter's lower rail voltage. During this interval, comparator 503 (which may be a relatively slow comparator) can perform a comparison of the sample Vsh corresponding to the inverter output voltage Vsw just prior to lower switch Q2 turning on. Because comparator 503 may be relatively slow, the comparator output voltage Vcmp may take a relatively long time to transition, as illustrated by slopes 644/645. If there is a sharp voltage transition 642, indicating that dead time Tdt2 is too short, then the comparator output (Vcmp) will be high (as will be a corresponding sample SW_ZVS of the comparator output, taken as described below). Otherwise, then dead time Tdt2 is not too long, and the comparator output (Vcmp) will be zero (as will be a corresponding sample SW_ZXVS of the comparator output, taken as described below).

Sampling the comparator output can be controlled by switch S3, which may be strobed at time t7, which is prior to time t8 at which lower switch Q2 is turned off by the transition of Gate2 to a low state. As a result of the strobing of switch S3, comparator output signal Vcmp can be sampled, appearing as signal SW_ZVS. This high value can be stored to allow for comparison of a sequence of switching events as described in greater detail below.

Figure 7:
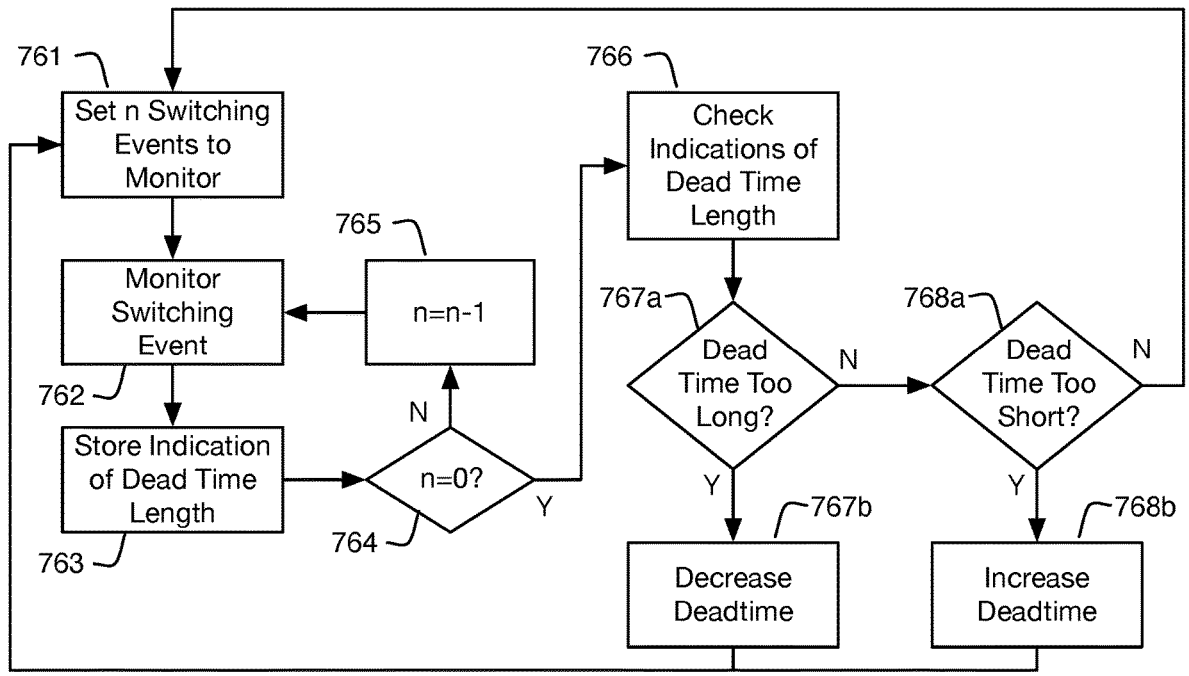
FIG. 7 illustrates a dead time optimization process for an inverter.

By operating the sampling circuit of FIG. 5 as described with reference to FIG. 6, a sequence of samples SW_ZVS indicating whether a corresponding sequence of switching events were suitable transitions (e.g., ZVS transitions without excessive body diode conduction time). This information may be used to adjust the dead time according to a process depicted in FIG. 7, which may be implemented (for example) by inverter controller circuitry 116. Beginning at block 761, the controller circuitry may be set to monitor "n" switching events, where "n" is the number of switching events. In some cases, this could be a sequence of "n" switching events, or it could be "n" switching events of just the upper switch or just the lower switch. In the latter case, separate monitoring sequences may be set up for respective switching devices. In block 762, the switching events may be monitored, with an indication of dead time length being stored for each (block 763). For example, as discussed above a "1" value (logic high) may be stored to indicate that the dead time was too long (or too short) or a "0" value (logic low) may be stored to indicate that the dead time not too short (or too long).

In block 764, the control circuitry can determine whether the determined number "n" of monitored switching events has occurred. If not, the counter may be decremented (block 764) and the controller can continue monitoring switching events (block 762) and storing the indications of dead time length (block 763). Otherwise, the controller can check the indications of dead time length (block 766). This check can take a variety of forms, as described in greater detail below. If the check indicates that the deadtime is too long (block 767a), then the control circuitry can decrease the dead time (block 767b), and the process can repeat. If the dead time is too short (block 768a), then the controller can decrease the deadtime (block 768b), and the process can repeat. Otherwise, if the dead time is neither too long nor too short, the process can repeat without increasing or decreasing the dead time.

Checking the indications of dead time length can take a variety of forms. In the various monitoring schemes described above, each switching event results in an indication of whether the dead time was too long or short (corresponding to a "1" logical value, for example) or not (corresponding to a "0" logical value, for example). Multiple switching events will thus result in multiple indications of these dead time values, which may also be thought of as multiple indications of whether zero voltage switching was achieved. The controller can determine whether the dead time should be changed based on any suitable analysis of this multiple set of indications. For example, the controller could adjust the dead time responsive to a predetermined number of consecutive indications that the dead time was too short. Additionally or alternatively, when analyzing "n" preceding events, the controller could adjust the dead time if a majority (n/2+1) of the preceding events so indicate or if a supermajority (e.g., ⅔ or ¾) of the preceding events so indicate. In some cases, the controller could adjust the dead time only if all the "n" preceding events so indicate. Thus, rather than control the dead time responsive to single switching events, the dead time may be adaptively controlled responsive to multiple preceding switching events. It is to be understood that this may result in some sub-optimal switching events; however, the net result can still result in improved control as the controller adapts to loading and other conditions to allow for dead times that achieve zero-voltage switching "most" of the time.

Figure 8A:
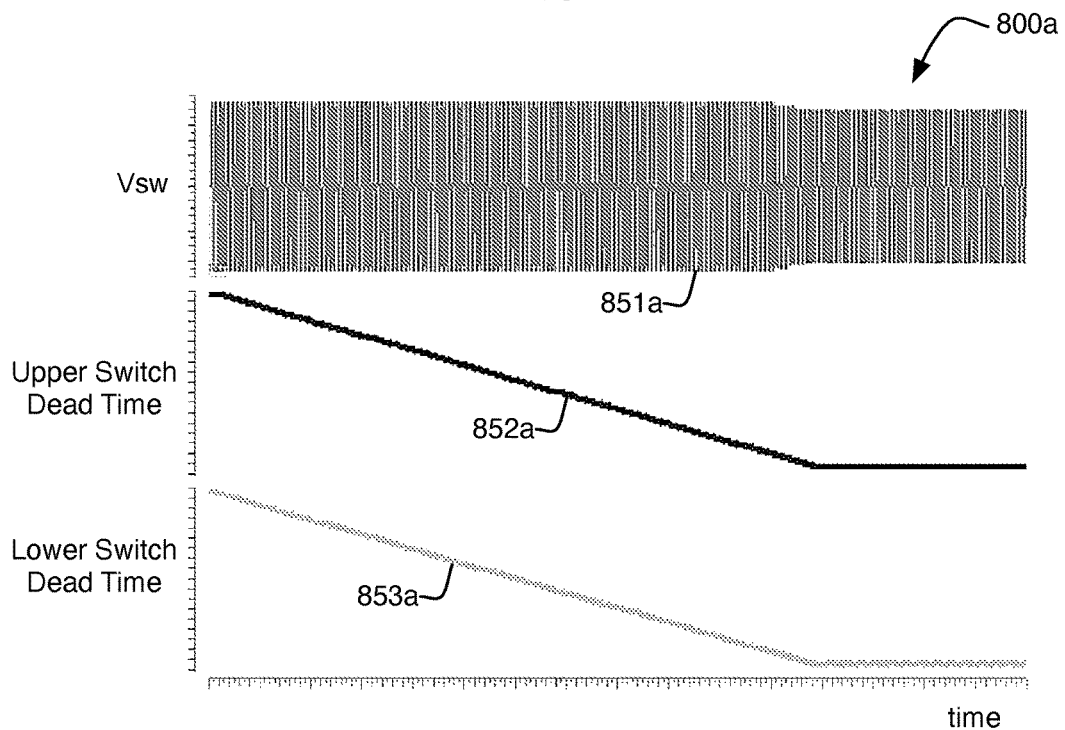
FIGS. 8A-8C illustrate the effects of a dead time optimization process for an inverter.
Figure 8B:
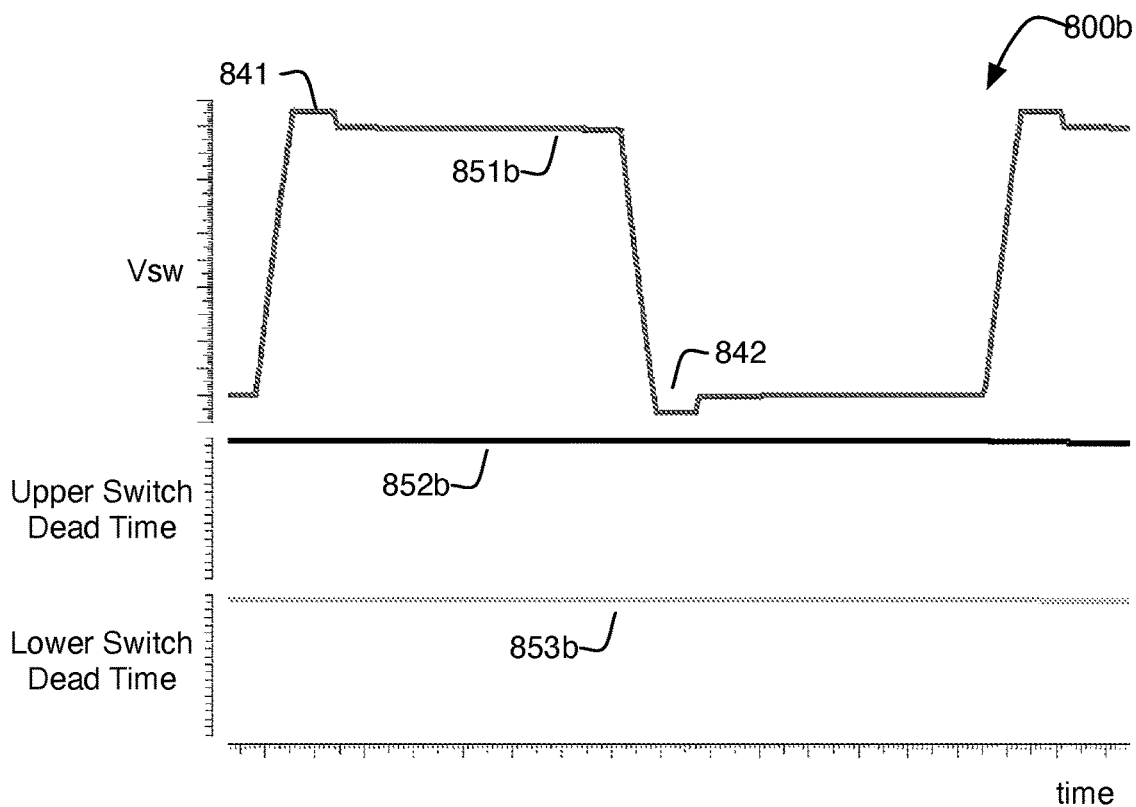
Figure 8C:
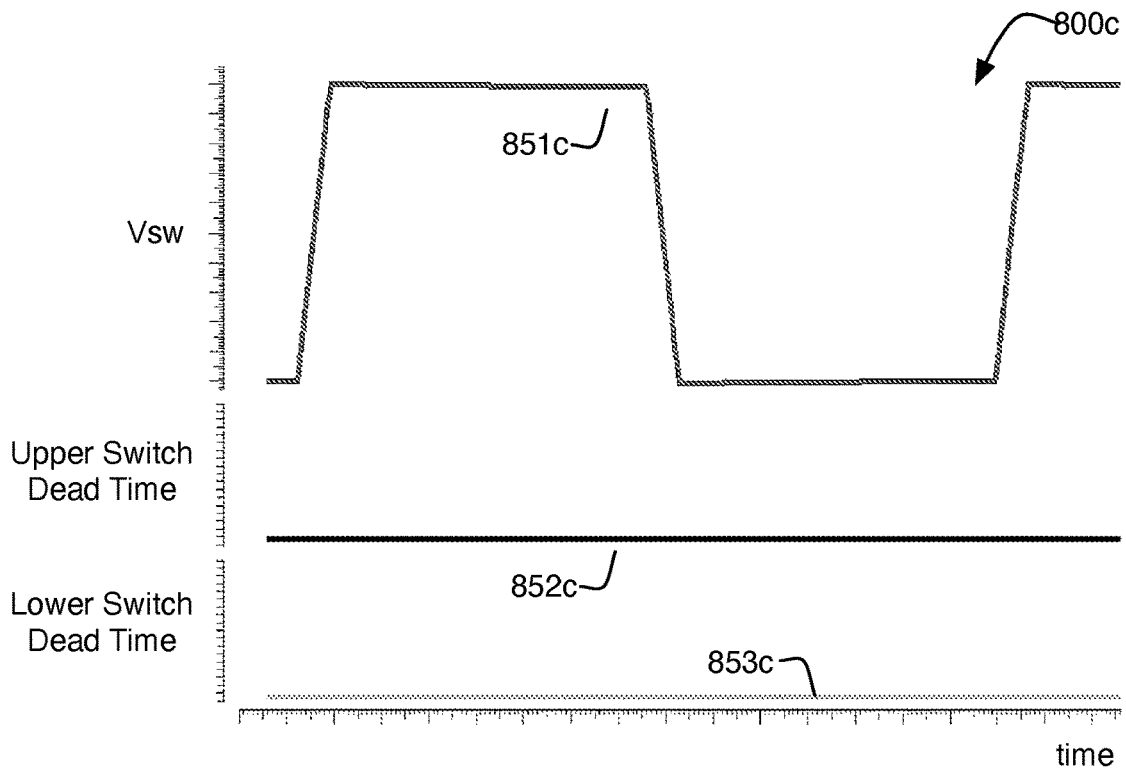

FIG. 8A illustrates a plot 800a of the inverter output Vsw (851a), the upper switch dead time for each switching cycle (852a), and the lower switch dead time for each switching cycle (853a) when implementing the above-described adaptive dead time control. As can be seen at the beginning both upper and lower switches ay exhibit a relatively long dead time, with such dead time being too long to allow for suitable switching. Over time, an adaptive controller as described above may continually decrease the dead time (852a/853a) until suitable switching is achieved, at which point the dead time values will hold relatively constant (as indicated in the right-hand portion of FIG. 8A). FIG. 8B illustrates plot 800b corresponding to a single switching cycle with a too long dead time, as in the left-hand portion of FIG. 8A. The upper switch dead time 852b and lower switch dead time 853b are shown as constant over the single switching cycle and decremented at the end of the switching cycle because of the non-zero voltage switching transitions indicating by overshoots 841 and 842 of inverter output voltage 851b. FIG. 8C illustrates plot 800c corresponding to an optimal dead time, as in the right-hand portion of FIG. 8A. The upper switch dead time 852c and lower switch dead time 853c are shown as constant over the single switching cycle and do not change at the end of the switching cycle because suitable switching was achieved, as indicated by the absence of overshoots or undershoots in the output voltage waveform 851c.

The foregoing describes exemplary embodiments inverter dead time optimization. Such systems may be used in a variety of applications but may be particularly advantageous when used in conjunction with inverters used in wireless power transfer systems, including high frequency wireless power transfer systems. Such wireless power transfer systems may be used to provide power, battery charging, etc. to personal electronic devices such as mobile computing devices (e.g., laptop computers, tablet computers, smart phones, and the like) and their accessories (e.g., wireless earphones, styluses and other input devices, etc.) as well as wireless charging accessories (e.g., charging mats, pads, stands, etc.). Although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The foregoing describes exemplary embodiments of wireless power transfer systems that are able to transmit certain information amongst the PTx and PRx in the system. The present disclosure contemplates this passage of information improves the devices' ability to provide wireless power signals to each other in an efficient manner to facilitate battery charging, such as by sharing of the devices' power handling capabilities with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system, and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communication between inductively coupled devices are spoofed.

The invention claimed is:

1. A method of adaptively controlling dead time between turn off of a first switching device of an inverter and turn on of a second switching device of the inverter that is a counterpart of the first switching device, the method comprising:
   monitoring a plurality of switching events of the first and second switching devices;
   storing for each monitored switching event an indication whether a dead time associated therewith permitted optimal switching, thereby storing a plurality of indications; and
   adaptively controlling the dead time responsive to the stored indications, wherein adaptively controlling, the dead time responsive to the stored plurality of indications further comprises:
      decreasing the dead time responsive to a plurality of indications that the dead time is too long; and
      increasing the dead time responsive to a plurality of indications that the dead time is too short.

2. The method of claim 1 wherein monitoring a plurality of switching events of at least one of the first and second switching devices further comprises:
   sampling an output voltage of the inverter; and
   comparing the sampled output voltage to one of a high reference voltage corresponding to a high inverter rail voltage and a low reference voltage corresponding to a low inverter rail voltage.

3. The method of claim 2 wherein comparing the sampled output voltage to a high reference voltage corresponding to a high inverter rail voltage determines whether a corresponding switching event of a high side switch was an optimal switching event corresponding to zero voltage switching without excessive body diode conduction time.

4. The method of claim 2 wherein comparing the sampled output voltage to a low reference voltage corresponding to a low inverter rail voltage determines whether a corresponding switching event of a low side switch was an optimal switching event corresponding to zero voltage switching without excessive body diode conduction time.

5. The method of claim 2 wherein the high reference voltage is 0.95 times the high inverter rail voltage, and the low reference voltage is 0.05 times the high inverter rail voltage.

6. The method of claim 1, wherein plurality of indications that the dead time is too long comprise a majority of the stored indications.

7. The method of claim 6, wherein the majority is a supermajority.

8. The method of claim 1, wherein plurality of indications that the dead time is too long comprises a selected number of sequential indications that the dead time is too long.

9. The method of claim 1, wherein plurality of indications that the dead time is too short comprise a majority of the stored indications.

10. The method of claim 9, wherein the majority is a supermajority.

11. The method of claim 1 wherein plurality of indications that the dead time is too short comprises a selected number of sequential indications that the dead time is too short.

12. The method of claim 1 wherein the plurality of indications that the dead time is too long correspond to excessive body diode conduction of at least one of the first and second switching devices, and the plurality of indications that the dead time is too short correspond to a lack of zero voltage switching of at least one of the first and second switching devices.

13. An inverter comprising:
   a first switching device;
   a second switching device that is a counterpart of and is switched complementarily to the first switching device; and
   control circuitry that:
      monitors a plurality of switching events of the first and second switching devices;
      stores a plurality of indications whether a dead time associated with the monitored plurality of switching events permitted optimal switching for each monitored switching event; and
      adaptively controls a dead time between turn off of the first switching device and turn on of the second switching device responsive to the plurality of stored indications by:
         decreasing the dead time responsive to a plurality of indications that the dead time is too long; or
         increasing the dead time responsive to a plurality of indications that the dead time is too short.

14. The inverter of claim 13 wherein the control circuitry that monitors a plurality of switching events of the first and second switching devices comprises:
- a sample and hold circuit that samples an output voltage of the inverter; and
- a comparator that compares the sampled output voltage to one of a high reference voltage corresponding to a high inverter rail voltage and a low reference voltage corresponding to a low inverter rail voltage.

15. The inverter of claim 13 wherein the plurality of indications that the dead time is too long or the plurality of indications that the dead time is too short comprise a majority of the stored indications.

16. The inverter of claim 15 wherein the majority is a supermajority.

17. The inverter of claim 13 wherein plurality of indications that the dead time is too long or the plurality of indications the dead time is too short comprises a selected number of sequential indications that the dead time is too long or that the dead time is too short.

18. The inverter of claim 13 wherein the plurality of indications that the dead time is too long correspond to excessive body diode conduction of at least one of the first and second switching devices, and the plurality of indications that the dead time is too short correspond to a lack of zero voltage switching of at least one of the first and second switching devices.

19. A wireless power transmitter comprising:
- an inverter that receives a DC input voltage and generates an AC output voltage;
- a wireless power transmitter coil that receives the AC output voltage and magnetically couples to a wireless power receiving coil of a wireless power receiver to facilitate wireless power transfer; and
- inverter controller circuitry that:
  - monitors a plurality of switching events of the first and second complementary switching devices of the inverter;
  - stores a plurality of indications whether a dead time associated with the monitored plurality of switching events permitted optimal switching for each monitored switching event; and
  - adaptively controls a dead time between turn off of the first switching device and turn on of the second switching device responsive to the plurality of stored indications by:
    - decreasing the dead time responsive to a plurality of indications that the dead time is too long; or
    - increasing the dead time responsive to a plurality of indications that the dead time is too short.

20. The wireless power transmitter of claim 19 wherein the inverter controller circuitry that monitors a plurality of switching events of at least one of the first and second switching devices comprises:
- a sample and hold circuit that samples an output voltage of the inverter; and
- a comparator that compares the sampled output voltage to one of a high reference voltage corresponding to a high inverter rail voltage and a low reference voltage corresponding to a low inverter rail voltage.

21. The wireless power transmitter of claim 19 wherein the plurality of indications that the dead time is too long or the plurality of indications that the dead time is too short comprise:
- a majority of the stored indications; or
- a selected number of sequential indications that the dead time is too long or that the dead time is too short.

22. The wireless power transmitter of claim 19 wherein the plurality of indications that the dead time is too long correspond to excessive body diode conduction of at least one of the first and second switching devices, and the plurality of indications that the dead time is too short correspond to a lack of zero voltage switching of at least one of the first and second switching devices.

* * * * *